April 7, 1959 H. H. HALL 2,880,497
METHOD OF MAKING PRESSURE MEASURING GAGE MEANS
Filed Dec. 13, 1955 7 Sheets-Sheet 1
*Fig. 1.*
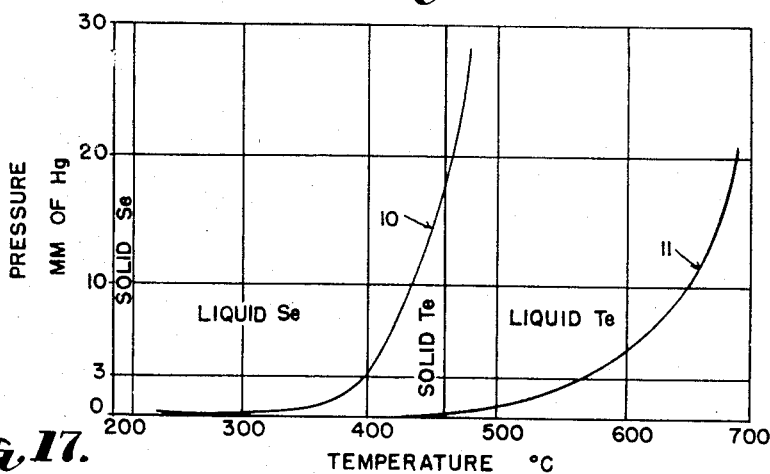
*Fig. 17.*
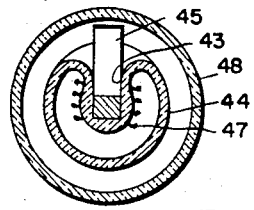
*Fig. 2.*
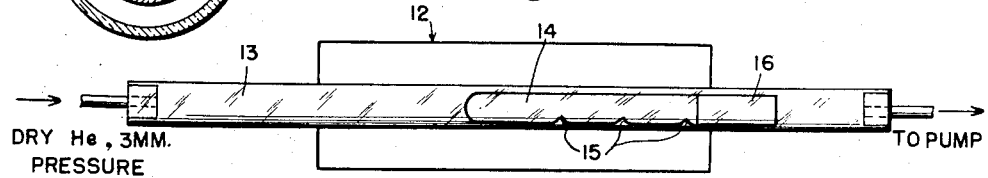
*Fig. 3.*
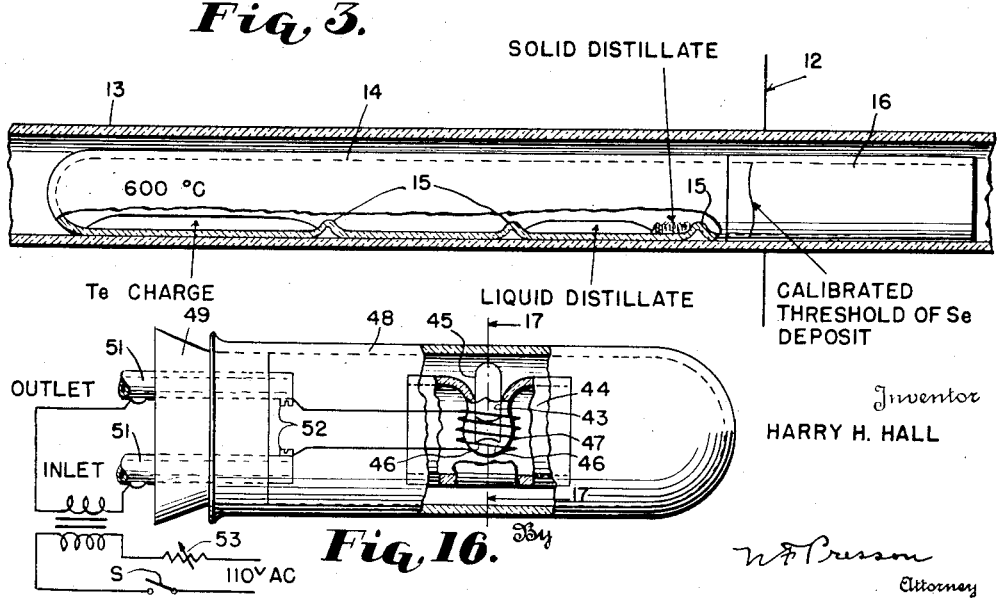
*Fig. 16.*
Inventor
HARRY H. HALL April 7, 1959          H. H. HALL          2,880,497
METHOD OF MAKING PRESSURE MEASURING GAGE MEANS
Filed Dec. 13, 1955          7 Sheets-Sheet 2

Inventor
HARRY H. HALL
By
Attorney

April 7, 1959
H. H. HALL
2,880,497
METHOD OF MAKING PRESSURE MEASURING GAGE MEANS
Filed Dec. 13, 1955
7 Sheets-Sheet 4
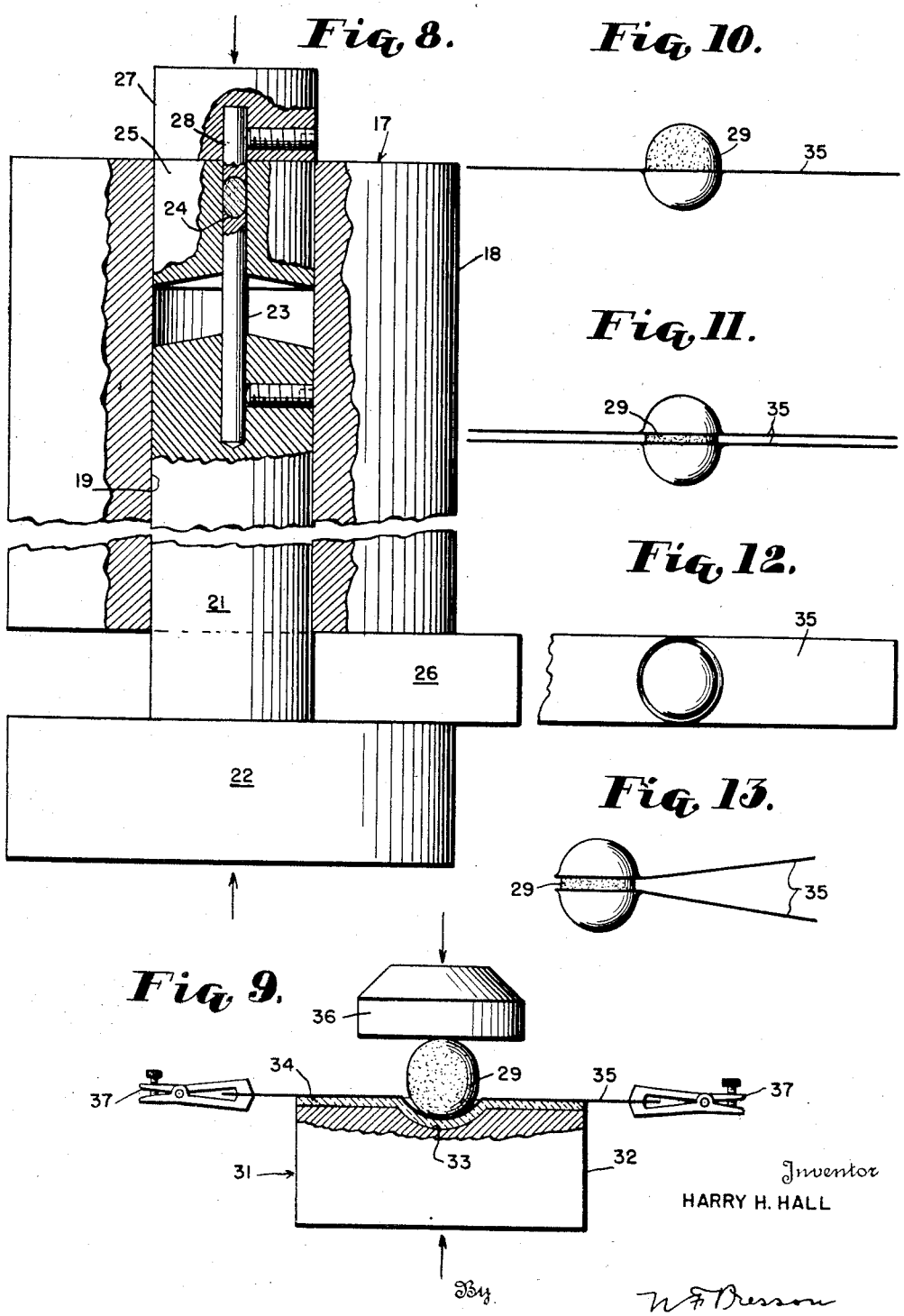

April 7, 1959 H. H. HALL 2,880,497
METHOD OF MAKING PRESSURE MEASURING GAGE MEANS
Filed Dec. 13, 1955 7 Sheets-Sheet 5
*Fig. 14.*
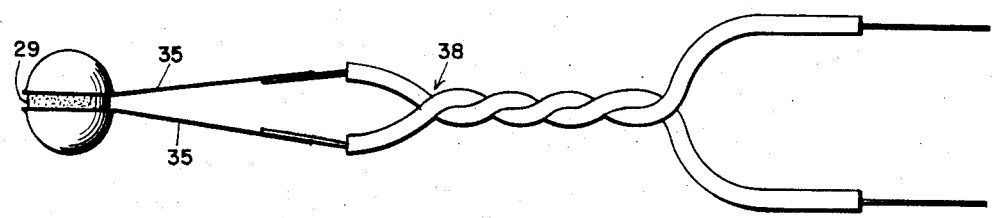
*Fig. 15.*
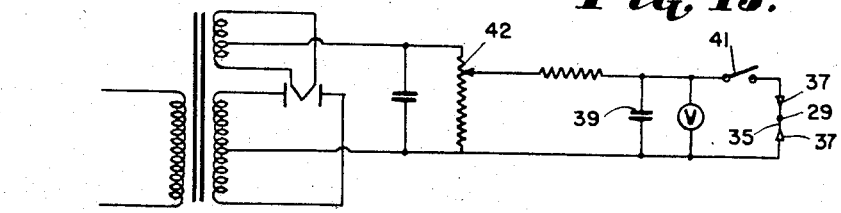
*Fig. 18.*
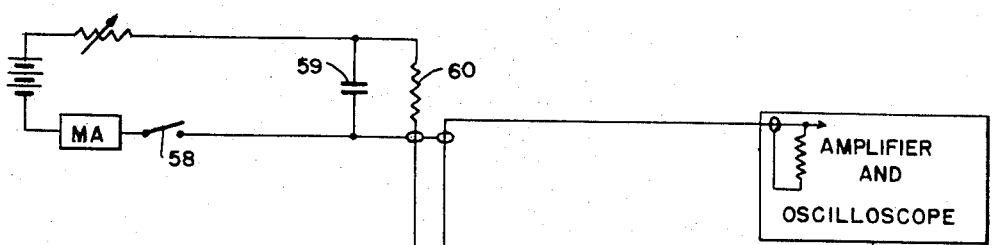
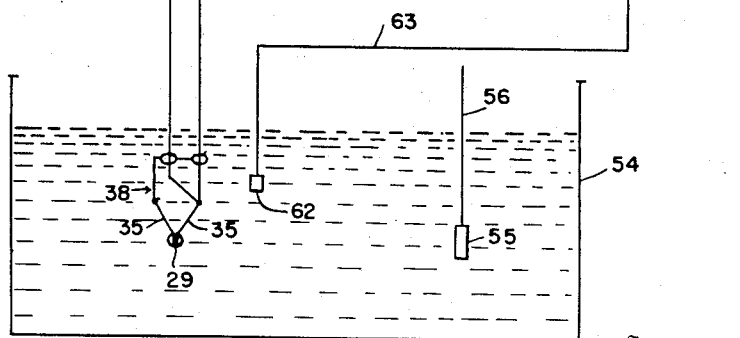
Inventor
HARRY H. HALL April 7, 1959     H. H. HALL     2,880,497
METHOD OF MAKING PRESSURE MEASURING GAGE MEANS
Filed Dec. 13, 1955     7 Sheets-Sheet 6
*Fig. 19.*
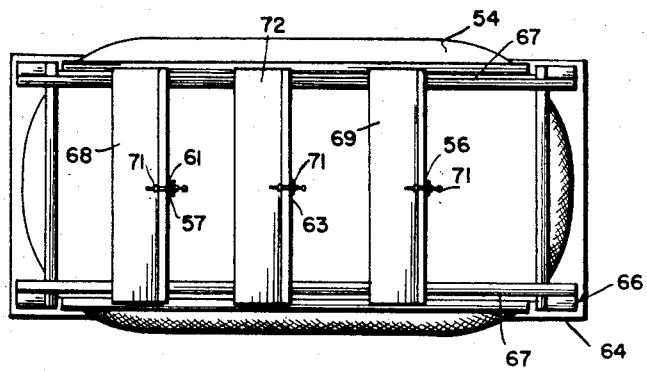
*Fig. 20.*
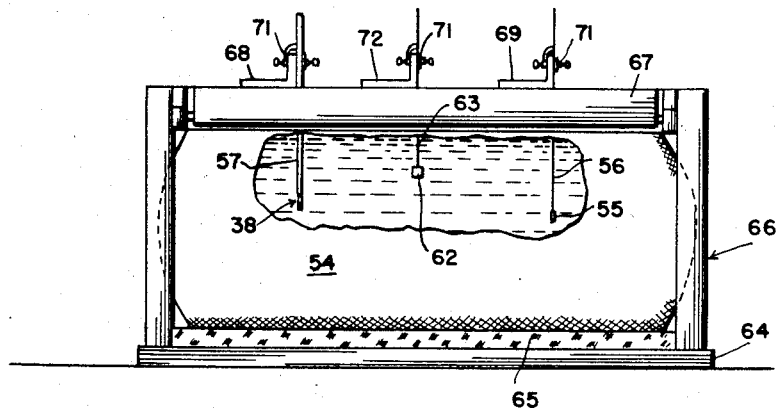
*Fig. 26.*          *Fig. 27.*
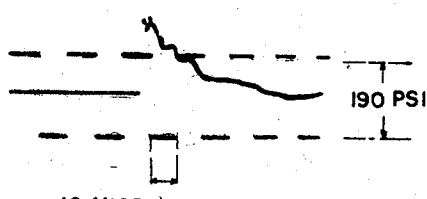 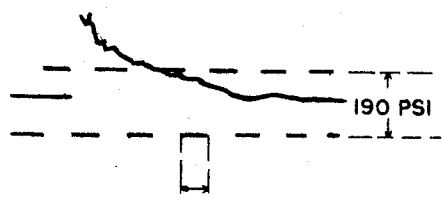
Inventor
HARRY H. HALL
By W. F. Presson
Attorney April 7, 1959     H. H. HALL     2,880,497
METHOD OF MAKING PRESSURE MEASURING GAGE MEANS
Filed Dec. 13, 1955     7 Sheets-Sheet 7
*Fig. 21.*    TE GAGE 339F    RANGE – INCHES
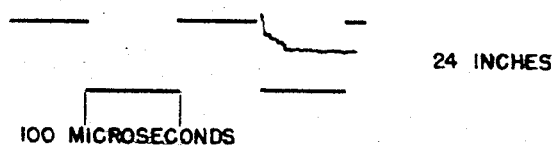
24 INCHES
100 MICROSECONDS
*Fig. 22.*
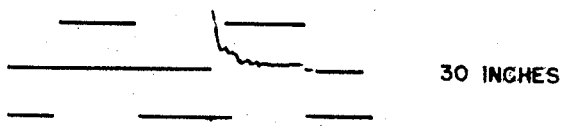
30 INCHES
*Fig. 23.*
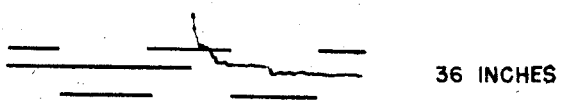
36 INCHES
*Fig. 24.*
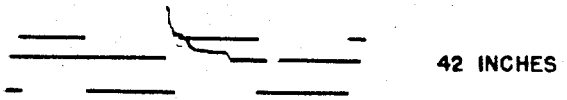
42 INCHES
*Fig. 25.*
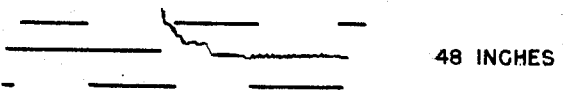
48 INCHES
SHOCK WAVE OF NO. 6 CAP
Inventor
HARRY H. HALL
By W. F. Presson
Attorney

2,880,497
METHOD OF MAKING PRESSURE MEASURING GAGE MEANS

Harry H. Hall, Durham, N.H.

Application December 13, 1955, Serial No. 552,904

5 Claims. (Cl. 29—155.5)

This invention relates to a device for detecting rapidly varying pressures and converting them into correlated electrical signals proportional thereto. More specifically, this invention relates to a pressure gage in which the pressure sensing element is composed of a semiconductor such as tellurium or the like, the method of constructing same and the system herein disclosed wherein the difference of potential between the electrodes of the semiconductor sensitive element having a constant current flowing therethrough is suddenly varied in response to a sudden shock or pressure wave applied thereto, and this potential difference is made manifest on a suitable indicating device.

The present invention is well adapted for the measurement of small underwater explosions, and because of its small size, it possesses sufficient resolution to record the fine structure of small scale shock pressures.

In devices of this character heretofore devised it has been the usual practice to employ a piezo-electric sensing element composed of quartz or tourmaline, for example, for the measurement of underwater pressure waves or shocks. Such devices have not been found altogether satisfactory under all conditions of service for the reason that such piezo-electric gages possess a high electrical impedance and are therefore unsuited for use with long cables or transmission lines, since they require a pure capacitance as an ideal electrical termination. Furthermore such prior art gages are unsuited for small scale model tests for the reason that they cannot be made small enough to attain the high resolving power required to detect fine details of the pressure wave.

The device of the present invention possesses all of the advantages of the prior art devices and none of the foregoing disadvantages.

In order to achieve this desirable result I have found it necessary to effect a high degree of purity in the tellurium element by a novel method of distillation, sintering or casting the tellurium, as the case may be, and fusing a pair of electrodes thereto. According to a preferred use thereof, the tellurium gage is exposed to an underwater shock such, for example, as a shock pressure generated by a small explosive source such as a No. 6 blasting cap disposed within the water at a short distance therefrom, and the force and character of the pressure wave impinging on the gage is made manifest on an oscilloscope or the like, as will hereinafter more clearly appear as the description proceeds.

One of the objects of the present invention is the provision of a new and improved method of preparing a semiconductor for use as a sensing element in a small pressure gage.

Another object is to provide a tellurium gage element having a small predetermined quantity of impurity therein to control the resistivity and temperature coefficient of pressure sensitivity thereof.

A further object is to provide a small pressure gage for measuring the force of the underwater explosion of a blasting cap, or the like, disposed subaqueously at a short distance therefrom.

A still further object is the provision of a system of measuring the force of a small underwater explosion by a semiconductor gage immersed in a copious supply of water within a tank composed of a material having a sound velocity less than that of water, whereby spurious pressure wave transmissions through the walls of the tank in advance of the shock wave in water, which would otherwise be recorded as unwanted noise, are eliminated.

A still further object is the provision of a new and improved method of attaching a pair of electrodes to a semiconductor gage.

Still other objects, advantages and improvements will be apparent from the following description taken in connection with the accompanying drawings of which:

Fig. 1 is a graphical illustration of the temperature at which two different semiconductors liquefy under different values of pressure;

Fig. 2 is a view on which is shown a furnace arrangement suitable for use with the present invention;

Fig. 3 is an enlarged fragmentary view of the device of Fig. 2 with a Te charge disposed therein;

Fig. 8 is a view in elevation and partly in section of a compacting die for compressing tellurium powder into a pellet;

Fig. 9 is a view of a fixture for clamping the sintered pellet to a platinum foil strip;

Fig. 10 is a view of the pellet with the platinum strip fused thereto;

Fig. 11 is a view similar to Fig. 10 with two platinum strips fused thereto;

Fig. 12 is a plan view of the pellet of Fig. 11;

Fig. 13 is a view of the pellet with one end of each of the platinum strips removed therefrom;

Fig. 14 is a view on which is shown the gage of the present invention connected to a pair of wires;

Fig. 15 is a circuit suitable for fusing the platinum strip to the pellet;

Fig. 16 is a view of a heater arrangement for preparing a semiconductor pressure gage by casting;

Fig. 17 is a view taken along the line 17—17 of Fig. 16;

Fig. 18 is a circuit suitable for testing the force of a small underwater explosion;

Fig. 19 is a plan view of a tank suitable for use with the present invention;

Fig. 20 is a view in elevation of the tank of Fig. 19;

Figs. 21 through 25 are recordings of a small underwater explosion measured at different distances therefrom;

Fig. 26 is a recording of an underwater explosion of a No. 6 cap measured at a distance of six feet; and Fig. 27 is a recording of an underwater explosion of one gram of Pentolite measured at six feet.

Figure 4:
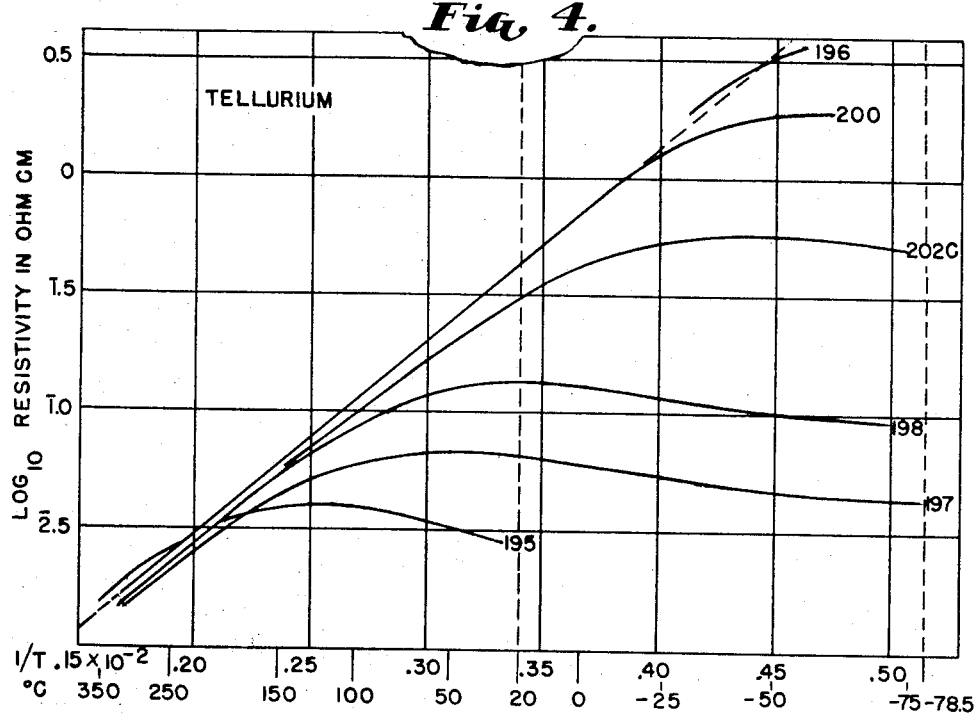
Fig. 4 is a family of curves representing the correlation between $\log_{10}$ of the resistivity of Te and the reciprocal of the absolute temperature of a number of samples of Te containing various degrees of impurity.

Whereas the gage sensing element of the present invention is composed of a semiconductor which possesses the desirable property of changing its resistance to a considerable degree in response to variations in pressure applied thereto while a small steady current is flowing therethrough, it will be understood that this desirable result is achieved only when the semiconducting element has been refined to a high degree of purity as will hereinafter more clearly appear. Semiconductors of this general class such, for example, as tellurium and germanium are well known.

Referring now to Fig. 1 for a more complete understanding of the invention, there is shown thereon, by way of example, two curves 10 and 11 illustrating the temperature-pressure relationship of selenium and tellurium respectively, the ordinate representing pressure in millimeters of mercury, and the abscissa the temperature variations between 200° C.–700° C. As clearly shown on Fig. 1 at a pressure of 3 millimeters, for example, there is a substantial range of temperature extending from 390° C. to 580° C. in which Te will condense, while Se which is often present as an impurity with Te will remain in the vapor state. A receiver maintained at a temperature within this range, therefore, should receive little Se.

*Preparation of the gage material*

In Fig. 2 is shown an apparatus for carrying out this fractionation, the apparatus comprising an electrically heated furnace 12, having a hot central region and a steep temperature gradient therefrom to the cooler ends of a furnace tube 13. A boiler tube 14 composed of Vycor, having three upstanding dams, or barriers 15, pressed into it as shown, is arranged in the furnace, within which is disposed a quantity of Te such that the Te is located within the center of the furnace. When the Te is evaporated at about 600° C., and under about 3 mm. of He or other suitable neutral atmosphere, it is condensed at the outer end of the boiler tube, first as a liquid, and farther out as a deposit of crystals. At the same time any Se which may be present as an impurity is deposited still farther out in the tube beyond a threshold, the position of which has been calibrated by a test evaporation of Se from the central boiler. Other low melting point impurities which may be present will likewise condense farther out than Te, while higher melting point impurities will tend to remain in the boiler as residue. A close fitting Pyrex sleeve 16 is slipped into the furnace tube, and the line of separation of the boiler tube and sleeve is located just inside the calibrated threshold of the Se condensate. The Se condensate and that of other low melting point impurities can now be discarded by removal of the sleeve.

Particular care must be exercised in cleaning the boiler tube in which the charge is to be melted and condensed in order to obtain the high degree of purity in the distilled Te necessary for satisfactory results. To this end the boiler tube is filled with a one tenth normal solution of hydrofluoric acid which is allowed to stand for 20 minutes. The boiler is now rinsed with tap water, thereafter with distilled water, and finally with distilled water which has been purified by contact with an ion exchange resin until its conductivity is not greater than about 0.8 microohm. The rinsing is continued until it causes no change of conductivity in the wash water.

By means of this arrangement Te is distilled as illustrated in Fig. 3. The Te recovered may be redistilled by the same method if necessary to obtain the desired degree of purity. In order to retard distillation until the desired temperature distribution between boiler and receiver is attained, the pressure of the helium is maintained at one atmosphere until this condition is reached, when it is quickly reduced to about 3 mm., and held at this value until the whole charge is distilled off.

In Fig. 4 are shown curves of $\log_{10}$ resistivity vs. the reciprocal of the absolute temperature T, for a number of samples of Te containing various degrees of impurity. Like other semiconductors at small values of $1/T$ (high temperatures), $\log_{10} \rho$ follows a generally straight line rising as the temperature falls. At a certain temperature range, however, $\log_{10} \rho$ departs from the straight line and becomes approximately constant with decreasing temperature. The temperature at which this deviation begins, and the ultimate value reached by $\log_{10} \rho$ at some low temperature such as $-78°$ C., are well known to depend upon the impurity content of the semiconductor. The greater the impurity content, the higher the temperature of the onset of this deviation, and the lower the value of $\log_{10} \rho$ at $-78°$ C.

Figure 5:
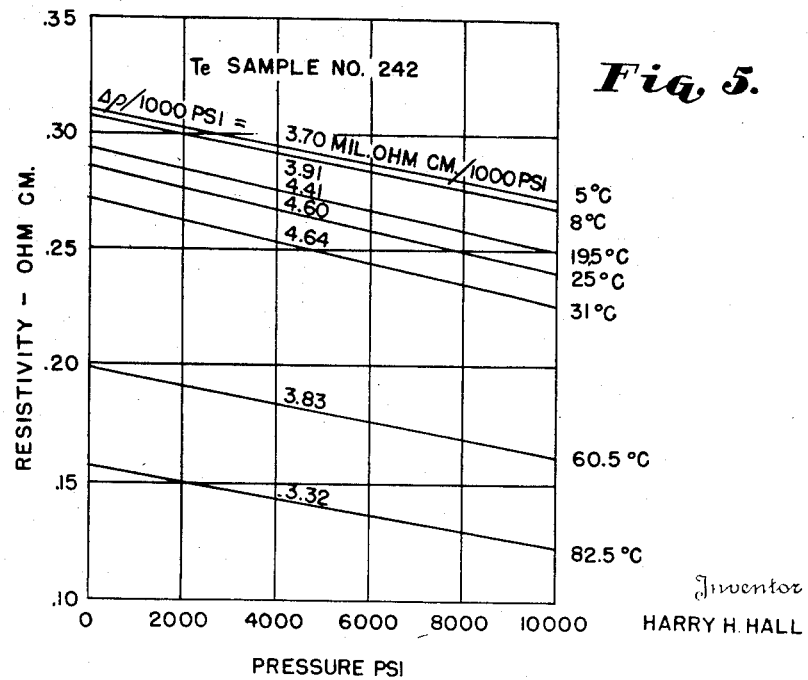
Fig. 5 is a graphical representation illustrating the dependence of the resistivity of Te sample No. 242 upon pressure at a variety of temperatures.

In Fig. 5 are shown a family of curves of the resistivity of a sample hereinafter identified as No. 242 of relatively pure Te plotted as functions of pressure for a series of temperatures. The change of resistivity $\Delta \rho$ per 1000 p.s.i., i.e., the slope of these curves, is seen to change with increasing temperature. This quantity is plotted against temperature in Fig. 6, in which the curves represent measurements on a variety of samples of Te, the resistivities of which at $-78°$ C. extend over a range similar to that represented in Fig. 4. This quantity determines the voltage signal which would be generated by a pressure gage composed of this material, when a constant current is passed through it as a pressure impulse is received thereby.

Figure 6:
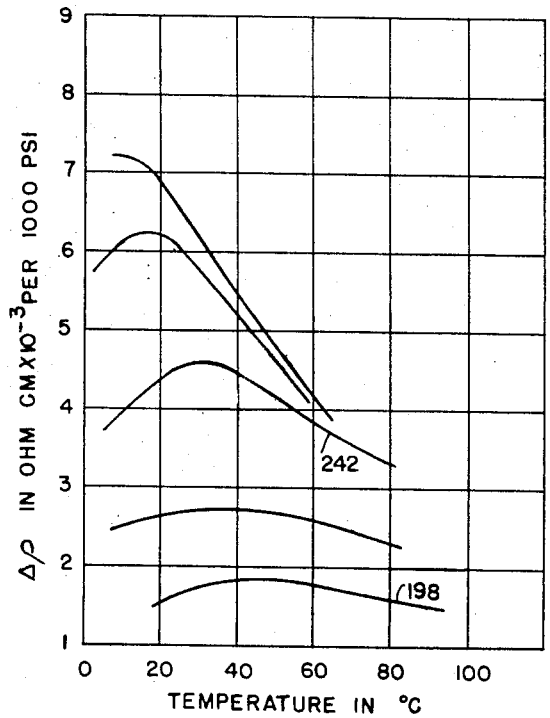
Fig. 6 is a family of curves for a variety of samples of Te including sample No. 242 of Fig. 5 representing the dependence of the change of resistivity for 1000 p.s.i. upon temperature.
Figure 7:
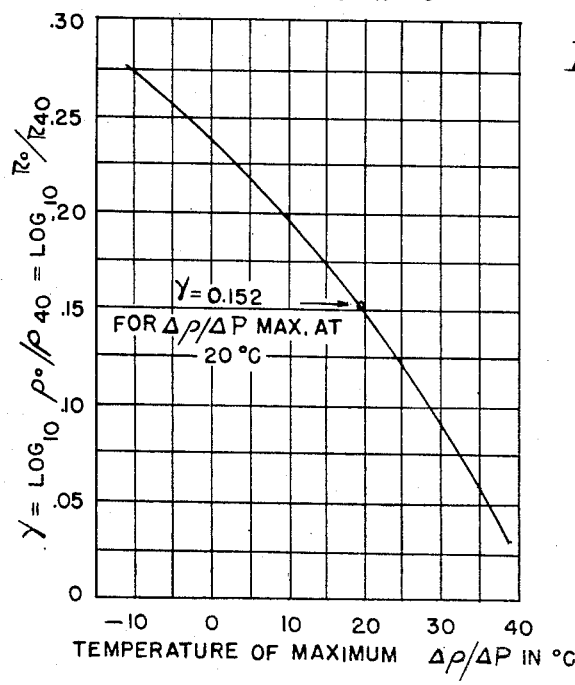
Fig. 7 is a curve representing the relationship of the quantity $\gamma$ to the temperatures of the maxima of the curves of Fig. 6.

The curves of Fig. 6 exhibit maxima which shift toward lower temperatures in passing from curve to curve in the direction of samples having higher resistivity (at $-78°$ C.) and an increase in purity. In the proximate region of a maximum the quantity $\Delta \rho$ per 1000 p.s.i. varies but little with changes in temperature. By adjusting the impurity content, this maximum, and its associated region of small temperature dependence, may be located at room temperature, or at any other desired temperature within a reasonable range. Since the temperature of the maximum is related to that at which the $\log_{10} \rho$ turns away from the straight line shown in Fig. 4, a sensitive and easily determined criterion of the temperature of the maximum is the ratio of the resistivity at 0° C. to that at 40° C., particularly when it is intended that the maximum shall occur at 20° C. It is convenient to denote the $\log_{10}$ of this ratio as $\gamma$. This has been found to take the values shown in Fig. 7. Since the resistance of a complete gage is proportional to the resistivity of its material, $\gamma$ also equals $\log_{10}$ of the ratio of the gage resistance at 0° C. to that at 40° C. These resistances may be more easily measured in the finished gage than the resistivities of the material. Fig. 7 indicates, for example, that a semiconductor material, or finished gage, having a $\gamma$ of 0.152 will have a small temperature coefficient near 20° C.

The purity of the Te distilled by the method described in the foregoing, Figs. 2 and 3, is greater than that desired for the preparation of gages having small temperature coefficients. The desired degradation of purity requires the addition of small amounts of an impurity which suitably affects the resistivity. Antimony has been found suitable for this purpose for the reason that it stands next before tellurium in the periodic table, and therefore has one too few electrons to satisfy the bonds of the Te crystal lattice, and on entering the lattice becomes an acceptor atom. The amounts of antimony to be added are of the order of one ten thousandth percent only, and the quantity of tellurium to be degraded in any one process is only a few grams. This is achieved by adding 1 percent of Sb to a 1 gram lot of pure Te in the melt, then adding 1 percent of this melt to another gram of Te and finally adding 1 percent of this last melt to a third gram of Te. This gives a concentration of .0001 percent of Sb, or about one atom of Sb in one million atoms of Te, since Te and Sb have nearly the same atomic weight, assuming that the Sb is evenly distributed throughout the Te. The following results were obtained.

|  | 25° C. | | | −78° C. | | |
| --- | --- | --- | --- | --- | --- | --- |
|  | ρ ohm cm. | log ρ | ρ 200/ρ | ρ ohm cm. | log ρ | ρ 200/ρ |
| Te sample No. 200 | .380 | Ī.58 | 1 | 1.90 | .28 | 1 |
| Te+.0001% Sb | .303 | Ī.481 | 1.25 | .463 | Ī.666 | 4 |
| Te+.01% Sb | .00836 | 3.922 | 45 | .00471 | 3.673 | 400 |
| Te+1% Sb | .00197 | 3.295 | 193 | .00127 | 3.104 | 1,500 |

From the foregoing it is clearly apparent that the addition of about one ten thousandth of one percent of antimony to relatively pure tellurium controls its resistivity and effectuates the maximum response to a pressure signal applied thereto with small temperature coefficient when the temperature of the ambient fluid through which the pressure signal is transmitted is about 20° C.

When small samples suitable for gage use are prepared from an ingot having the desired value of γ, the γ's of the samples are often found to differ considerably between themselves and from that of the original ingot. This is due to an inhomogeneous distribution of the antimony in the parent ingot. To promote homogeneity, the well known method of "zone leveling," which forms no part of the present invention, is employed, in which a small molten zone of the semiconductor material is made to traverse the ingot from end to end and return, until resistivity tests indicate that the desired condition of uniformity has been attained. After this procedure the γ's of small samples are found to be more nearly alike, and more nearly equal to that of the parent ingot. The term "zone leveling" as employed herein may be defined as the process described in "Transactions of the American Institute of Mining and Metallurgical Engineers," vol. 194, pages 747–753, 1952.

Preparation of sintered Te gage

The means employed for compressing the tellurium-antimony pellet will best be understood by reference to Fig. 8 on which is shown a compacting die or press indicated generally by the numeral 17 and comprising a strong cylindrical member 18 having a bore 19 axially arranged therein adapted to receive a plunger 21 having a head 22 thereon. The upper end of the plunger is provided with a hardened rod 23 of substantially 1/16" diameter terminating at the upper end thereof in a hemispherical cavity 24. A hardened cylindical steel insert 25 is secured within the upper end of bore 19 and provided with a bore coaxial therewith and adapted to receive the rod 23. A spacing element 26 is employed to maintain the plunger 21 in an initial position as illustrated. An anvil 27 is detachably positioned on the top of insert 25 and provided with a downwardly projecting cylindrical portion 28 adapted to be slideably received within insert 25 and having a complementary hemispherical cavity formed in the lower end thereof.

In operation, the anvil is removed and the cavity above the upper end of the rod 23 is filled with tellurium and antimony powder which has been sieved to 100 mesh and reduced in hydrogen at 200° C. for 20 minutes. The anvil is now inserted and the spacing element 26 is removed. The die is now pressed until the force thereon rises to the value of 400 pounds thereby applying a pressure of 100,000 p.s.i. to the powder. The anvil 27 and plunger 21 are now removed and the tellurium pellet 29 is removed therefrom. This pellet is sintered at 400° C. in helium, at one atmosphere, for eleven hours after which it is placed in the fusing fixture indicated generally by the numeral 31, Fig. 9.

The fixture comprises a base member 32 composed of any material suitable for the purpose such, for example, as wood and provided with a spherical depression 33 on the upper surface thereof covered by a strip of mica 34. A strip of platinum foil 35 having a thickness of .002" and a width of one-sixteenth inch is laid on the mica strip and the sintered Te pellet 29 is placed thereon as shown on Fig. 9. The Te pellet is held lightly but firmly against the platinum foil by the member 36 illustrated. A pair of clips 37 are secured to the ends of platinum foil for establishing an electrical connection to a source of welding or fusing current. When the current has been applied to clips 37, the platinum strip is quickly heated to a red glow and the surface of the Te element melts and fuses to the platinum, Fig. 10, the fusing operation taking place so rapidly that no appreciable oxidation results.

The pellet is removed from the fixture and placed on a second strip of platinum foil with the first strip of foil uppermost and the clips are transferred to the second platinum strip. The member 36 is replaced and a welding current is again applied to the clips 37 thereby fusing the second platinum strip to the pellet as shown in Fig. 11, a plan view of which is shown on Fig. 12 with the clips 37 removed. One end of each of the platinum strips is removed as shown in Fig. 13 and the remaining lengths of platinum foil are connected to a pair of plastic insulated tinned wires, preferably of No. 22 gage, in any suitable manner as by soldering the parts together as shown on Fig. 14. The whole assembly is now dipped in Araldite Casting Resin B and the thin coat remaining after draining is heated to cure the resin. The assembly is dipped into the resin a second time and again cured. The finished gage indicated generally by the numeral 38 is now ready for use.

A circuit suitable for fusing the platinum electrodes to the pellet is shown on Fig. 15 in which condenser 39 preferably of 500 mf. capacity is suddenly discharged by closure of mercury switch 41 through the platinum strip thereby providing an arrangement in which the amount of heating is easily and accurately controlled. The voltage of condenser 39 may be varied by adjustment of poteniometer 42, a voltage of 275 volts having been found satisfactory for use with a platinum strip 0.002" x 0.062" x 9/16".

Preparation of Cast Te gage

The semiconductor element of the pressure gage, if desired, may be composed of tellurium cast between the pair of platinum electrode elements in lieu of fusing a sintered pellet of tellurium thereto by a condenser discharge as heretofore described. To achieve this result, the tellurium antimony mixture is crushed in an agate mortar, and about 35 mg. of it is placed in the bottom of a well 43, pressed into the side of a short piece of 3/4" diameter Vycor tube 44 by means of a suitable steel form, Fig. 16, the tube 44 having been previously cleaned as set forth hereinbefore with respect to the boiler tube of Fig. 3. The ends of a strip 45 of clean platinum foil .002" thick, 1/16" wide, and 5/8" long, bent into a U shape are inserted into the mold, and are retained by shallow depressions 46 at either side of the bottom of the well. The charged mold is placed in a Chromel heater coil 47 and covered with a short test tube 48, as shown in Fig. 16. The tube 48 is closed by a stopper 49 having a pair of copper tubes 51 extending therethrough to which are connected the ends of the heater coil in any suitable manner as by the pair of screws 52. The tubes 51 are in electrical connection with the secondary winding of a transformer such, for example, as the filament transformer illustrated whereby the heater is energized when the switch S connected to the primary winding of the transformer is closed, the degree of heating by current through the coil 47 being controlled by the setting of the variable resistor element or variac 53.

The preparation of the tellurium material and casting thereof will now be described.

The space within tube 48 is first evacuated and then filled with helium which is allowed to flow slowly through it by way of tubes 51 at atmospheric pressure. Current is now passed through the heater until the tellurium melts, when it is immediately shut off before the tellurium, which readily wets the platinum, can spread over much of the surface of the foil. The platinum foil is now removed with the Te fused to the ends thereof in the form of a small cast block, and the platinum strip is severed at the bend of the U. The two platinum tabs thus formed are connected to a pair of plastic insulated tinned wires, preferably of No. 22 gage size in any suitable manner as by soldering the parts together as shown in Fig. 14. The whole assembly is now dipped in Araldite Casting Resin B and the thin coat remaining after draining is heated to cure the resin. The assembly is dipped into the resin a second time and again cured. The finished gage is now ready for use.

Whereas in the foregoing process the Te is crushed in an agate mortar and the small pieces thereof are placed in the bottom of the well, it will be understood that, if desired, the Te may be molded into a pellet of sufficient size to fit easily into the well within the end portions of the bifurcated platinum strip and fused thereto by the apparatus of Fig. 16.

*Use of Te gage for recording underwater shock pressures*

On Fig. 18 is shown in schematic form a system for recording underwater shock pressures caused by a small explosion within the water contained within a tank 54. The explosion is obtained by firing of a small explosive charge 55 which, for example, may be a No. 6 blasting cap, by applying a firing impulse in any well known manner over the conductors within the firing cable 56. Disposed at a suitable distance as, for example, six feet from the explosive charge is the finished tellurium gage 38 of the instant invention to which a steady D.C. current preferably in the order of 100 ma. is applied continuously to the platinum electrodes thereof through a ballast resistance 60 of the order of 93 ohms, whose function is to maintain the current through the gage element substantially constant, and through cable 57 when the switch 58 thereof is closed, a condenser 59 having a capacity preferably of .1 mf. being employed to prevent undesired noise signals from being transmitted through the battery circuit to the gage element. The output terminals of the gage are connected by cable 61 to the amplifier and oscilloscope illustrated, the input impedance of which is preferably of the order of 93 ohms. A trigger gage 62 composed, for example, of tourmaline as the sensing element is connected as shown on Fig. 18 to the single sweep trigger of the oscilloscope for obtaining a reference line on the oscillogram as the explosive charge is fired.

On Figs. 19 and 20 is shown in plan and elevation respectively a novel tank arrangement suitable for use with the system of Fig. 18, the tank comprising a base section 64 covered by a two inch cork board 65 and having an upstanding frame generally indicated at 66 to which is secured at the upper end portions thereof a pair of longitudinal strips 67 carrying a pair of L-shaped members 68 and 69 respectively. The member 68 has secured thereto as by a clamp 71 the pair of shielded cables 57 and 61 to which the Te gage is connected. The member 69 supports the explosive charge 55 within the water by cable 56 to which the member is secured by the clamp 71 illustrated. A third L-shaped member 72 is carried by the strips 67 and employed to support the trigger gage 62 by cable 63 secured thereto.

The tank 54 is composed of heavy waterproof canvas, such as used for tarpaulins and truck covers supported by the wooden frame as illustrated, and having the lower or floor portion resting on the cork board 65, no portion of the walls below the water line touching any part of the frame. Leakage is prevented by a suitable coating such as two coats of a material known in the trade as "Tygon K-23" applied thereto. When empty, the tank may conveniently be 2 feet wide, 5 feet long and 2½ feet deep. With these dimensions the tank permits a range of four feet from the source of explosion to the Te gage with a delay in the first direct reflection of at least 50 microseconds. By employing a tank structure of the type disclosed in which the sound velocity thereof is less than that of water, spurious vibrations which would otherwise be recorded prior to the shock wave are eliminated. The L-shaped members 68, 69 and 72 are adjustable to different positions along the strips or rails 67 such that the distances between the explosive charge and the Te gage may be adjusted at will and the gage 62 may be positioned at any desired point with respect thereto.

Figs. 21 to 25 show the pressure recording of the sintered Te gage at distances of 24, 30, 36, 42 and 48 inches respectively from a No. 6 cap employed as an explosive source in which a square timing wave of 200 microseconds period is employed as a time reference.

On Fig. 26 is shown the pressure recording in a large body of water of the sintered Te gage at a distance of 6 feet from a No. 6 cap and Fig. 27 shows the pressure wave recorded by the sintered Te gage at a distance of 6 feet from an explosive composed of 1 gram of Pentolite.

Whereas the invention has been described in detail with reference to sintered or cast tellurium as the material composing the sensing element of the novel pressure gage of the present invention it will be understood that other semiconductors such, for example, as germanium may be employed, if desired, it being merely necessary to purify the semiconductors in the manner disclosed and maintain a small continuous D.C. current flow through the gage while measurements of small underwater explosions are taken.

While the invention has been described with particular reference to a particular semiconductor which gives satisfactory results, it is not so limited as various changes and modifications may be made by one skilled in the art, after understanding the invention, without departing from the spirit and scope of the invention and it is my intention, therefore, in the appended claims to cover all such changes and modifications.

What is claimed as new and desired to be secured by Letters Patent of the United States is:

1. The method of preparing a tellurium pellet for use as the sensing element of a pressure gage of small size and high resolution which comprises the steps of distilling about thirty grams of powdered tellurium in a furnace at 600° C. under 3 mm. of helium, redistilling the distillate until no residue is obtained, adding only about one part per million of antimony to the melted distillate thereby to cause the rate of change of the resistivity due to increasing pressure, to pass over a maximum value as the temperature increases through a desired working range and rendering this rate of change with pressure substantially independent of temperature near this maximum value, zone leveling the mixture, crushing the mixture in a mortar, passing the mixture through a 100 mesh screen, reducing said mixture in hydrogen, pressing the mixture into a pellet at a pressure of 100,000 pounds per square inch, and thereafter sintering said pellet in helium for about eleven hours at one atmosphere at a temperature of 400° C.

2. The method of preparing a tellurium pellet for use as the sensing element of a pressure gage of small size and high resolution which comprises the steps of distilling a quantity of powdered tellurium in a furnace at a temperature of the order of 600° C. under substantially 3 mm. of helium, redistilling the distillate until substantially no residue is obtained, degrading the purity of the tellurium by adding to the melted distillate only a sufficient amount of an impurity which stands close to tellurium in the periodic table to effectuate a high degree of response, which is substantially independent of temperature in a moderate temperature range, to a pressure signal suddenly applied to the pellet through an ambient fluid of about 20° C., zone leveling the mixture, crushing the mixture in a mortar, passing the mixture through a fine mesh screen, reducing said mixture in hydrogen, pressing the mixture into a pellet at a pressure of the order of 100,000 pounds per square inch, and thereafter sintering said pellet in helium for about eleven hours at one atmosphere at a temperature of the order of 400° C.

3. The method according to claim 2 in which the amount of said impurity is about one ten thousandth percent only.

4. The method according to claim 3 in which said impurity is antimony.

5. The method according to claim 4 in which said amount is achieved by adding approximately one percent of antimony to one gram of pure tellurium in the melt, adding approximately one percent of this melt to another gram of tellurium, and thereafter adding approximately one percent of this last named melt to still another gram of tellurium.

References Cited in the file of this patent

UNITED STATES PATENTS

| | | |
|---|---|---|
| 1,585,431 | Snelling | May 18, 1926 |
| 1,847,888 | Nickle | Mar. 1, 1932 |
| 2,121,603 | Lotz | June 21, 1938 |
| 2,329,038 | Ellis et al. | Sept. 7, 1943 |
| 2,414,294 | Gardner | Jan. 14, 1947 |
| 2,548,947 | Clewell | Apr. 17, 1951 |
| 2,609,470 | Quinn | Sept. 2, 1952 |
| 2,618,962 | Plumley et al. | Nov. 25, 1952 |
| 2,629,922 | Finch | Mar. 3, 1953 |
| 2,750,657 | Herbert | June 19, 1956 |
| 2,799,081 | Farnham | July 16, 1957 |

OTHER REFERENCES

T. Fukuroi et al.: Article in Science Repts., Res. Inst. Tohoku Univ. (Sendai, Japan), 1,373 (1949), 2,239 (1950), 4,283 (1952). (In English)—digested in Chem. Abstracts, vol. 45 (1952), pp. 4988 and 6442.